(12) United States Patent
Hüger et al.

(10) Patent No.: US 11,186,224 B2
(45) Date of Patent: Nov. 30, 2021

(54) METHOD AND TRAILER-COUPLING ASSISTANCE FOR ASSISTING IN THE COUPLING PROCESS OF A TRANSPORTATION VEHICLE REVERSING TOWARD A TRAILER

(71) Applicant: VOLKSWAGEN AKTIENGESELLSCHAFT, Wolfsburg (DE)

(72) Inventors: Philipp Hüger, Rühen (DE); Johannes Fuhs, Mömlingen (DE)

(73) Assignee: Volkswagen Aktiengesellschaft

( * ) Notice: Subject to any disclaimer, the term of this patent is extended or adjusted under 35 U.S.C. 154(b) by 0 days.

(21) Appl. No.: 16/764,549

(22) PCT Filed: Nov. 12, 2018

(86) PCT No.: PCT/EP2018/080967
§ 371 (c)(1),
(2) Date: May 15, 2020

(87) PCT Pub. No.: WO2019/096746
PCT Pub. Date: May 23, 2019

(65) Prior Publication Data
US 2020/0276934 A1    Sep. 3, 2020

(30) Foreign Application Priority Data

Nov. 16, 2017    (DE) ..................... 10 2017 220 459.1

(51) Int. Cl.
*B60R 1/00*    (2006.01)
*G06T 7/13*    (2017.01)
(Continued)

(52) U.S. Cl.
CPC ................ *B60R 1/003* (2013.01); *B60D 1/06* (2013.01); *B60D 1/36* (2013.01); *G06K 9/00791* (2013.01);
(Continued)

(58) Field of Classification Search
CPC . B60D 1/36; B60D 1/06; B60D 1/363; B60D 1/62; B60R 1/00; B60R 2300/808;
(Continued)

(56) References Cited

U.S. PATENT DOCUMENTS 9,731,568 B2    8/2017  Wuergler et al.
10,259,453 B2 *  4/2019  Fletcher .................... B60T 7/22
(Continued)

FOREIGN PATENT DOCUMENTS

CN    106203237 A  *  12/2016
DE    102009029439 A1    3/2011
(Continued)

OTHER PUBLICATIONS

Monocular Video-Based Trailer Coupler Detection using Multiplexer Convolutional Neural Network (Year: 2017).*
(Continued)

*Primary Examiner* — Nizar N Sivji
(74) *Attorney, Agent, or Firm* — Barnes & Thornburg LLP

(57) ABSTRACT

A method for assisting a coupling process of a transportation vehicle reversing toward a trailer which includes detecting a ball head coupling of the trailer based on a camera image recorded by a camera of the transportation vehicle, limiting the camera image to an image detail in which the ball head coupling is disposed, detecting at least one curved front edge of the ball head coupling within the limited image detail, and determining the engagement position fir a vehicle-side ball head based on the at least one detected curved front edge of
(Continued)

the ball head coupling. A trailer coupling assistant for a transportation vehicle.

20 Claims, 3 Drawing Sheets

(51) Int. Cl.
*G06T 7/70* (2017.01)
*B60D 1/06* (2006.01)
*B60D 1/36* (2006.01)
*G06K 9/00* (2006.01)

(52) U.S. Cl.
CPC ............... *G06T 7/13* (2017.01); *G06T 7/70* (2017.01); *G06T 2207/30252* (2013.01)

(58) Field of Classification Search
CPC ............ B60R 1/003; B60R 2011/004; B60R 2300/301; B62D 13/06; G06T 2207/30252; G06T 7/70; G06T 2207/10016; G06T 2207/30261; G06T 7/248; G06T 7/13; G06K 9/00791
See application file for complete search history.

(56) References Cited

U.S. PATENT DOCUMENTS

| | | | | |
|---|---|---|---|---|
| 2006/0255560 | A1* | 11/2006 | Dietz | B60D 1/36 280/477 |
| 2007/0216136 | A1* | 9/2007 | Dietz | B60D 1/36 280/477 |
| 2009/0236825 | A1 | 9/2009 | Okuda et al. | |
| 2010/0324770 | A1 | 12/2010 | Ramsey et al. | |
| 2013/0242101 | A1 | 9/2013 | Schneider et al. | |
| 2014/0125795 | A1* | 5/2014 | Yerke | B60R 1/00 348/118 |
| 2015/0069736 | A1* | 3/2015 | Trevino | H04N 7/183 280/477 |
| 2015/0115571 | A1* | 4/2015 | Zhang | H04N 7/183 280/477 |
| 2015/0321666 | A1* | 11/2015 | Talty | G05D 1/0259 701/41 |
| 2016/0052548 | A1* | 2/2016 | Singh | B60D 1/36 701/37 |
| 2016/0375831 | A1* | 12/2016 | Wang | B62D 15/0295 348/148 |
| 2016/0378118 | A1* | 12/2016 | Zeng | B60D 1/62 701/28 |
| 2017/0151846 | A1* | 6/2017 | Wuergler | B60D 1/62 |
| 2017/0174128 | A1* | 6/2017 | Hu | G06T 7/74 |
| 2017/0341583 | A1* | 11/2017 | Zhang | B60R 1/00 |
| 2018/0043933 | A1* | 2/2018 | Hu | G06K 9/4609 |
| 2018/0215382 | A1* | 8/2018 | Gupta | B60W 30/18036 |
| 2018/0312022 | A1* | 11/2018 | Mattern | G05D 1/0225 |
| 2018/0312112 | A1* | 11/2018 | Lewis | B60R 1/003 |

FOREIGN PATENT DOCUMENTS

| | | |
|---|---|---|
| DE | 102010004920 A1 | 7/2011 |
| DE | 102012001380 A1 | 8/2012 |
| DE | 102012005707 A1 | 10/2012 |
| DE | 102014212041 A1 | 12/2015 |
| DE | 102016122916 A1 | 6/2017 |
| DE | 102017211395 A1 | 2/2018 |
| GB | 2513393 A | 10/2014 |
| WO | 2012103193 A1 | 8/2012 |

OTHER PUBLICATIONS

Advanced 3-D Trailer Pose Estimation for Articulated Vehicles (Year: 2015).*
Search Report for International Patent Application No. PCT/EP2018/080967; dated Feb. 14, 2019.

* cited by examiner

METHOD AND TRAILER-COUPLING ASSISTANCE FOR ASSISTING IN THE COUPLING PROCESS OF A TRANSPORTATION VEHICLE REVERSING TOWARD A TRAILER

PRIORITY CLAIM

This patent application is a U.S. National Phase of International Patent Application No. PCT/EP2018/080967, filed 12 Nov. 2018, which claims priority to German Patent Application No. 10 2017 220 459.1, filed 16 Nov. 2017, the disclosures of which are incorporated herein by reference in their entireties.

SUMMARY

Illustrative embodiments relate to a method and a trailer-coupling assistant for assisting in a coupling process of a transportation vehicle reversing toward a trailer.

BRIEF DESCRIPTION OF THE DRAWINGS

Disclosed embodiments are explained in more detail with reference to the drawings. The features and feature combinations cited in the description, and the features and feature combinations described in the following figure description and/or shown purely in the figures, may be used not only in the respective combination given but also in other combinations or alone. In the drawings.

DETAILED DESCRIPTION

Figure 1:
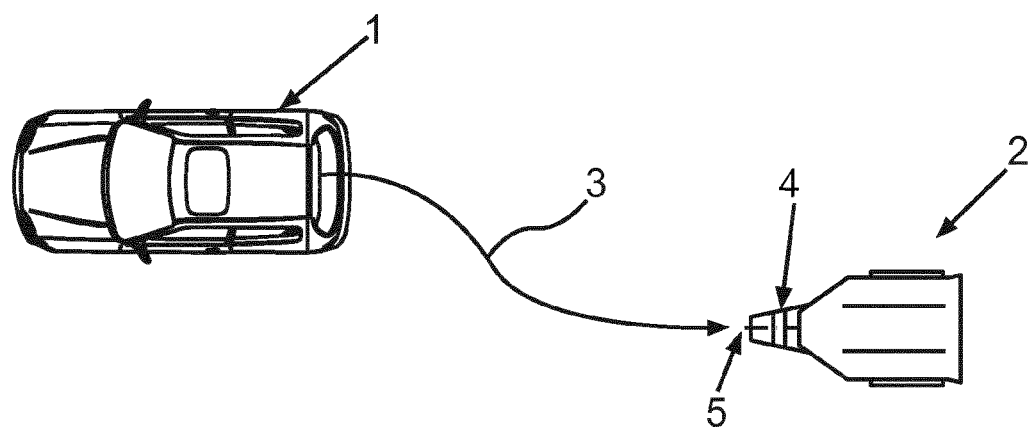
FIG. 1 shows a top view of a coupling process of a transportation vehicle reversing up to a trailer.

To couple a trailer, it is necessary for a transportation vehicle to reverse in targeted state up to the drawbar of the trailer. For lightweight trailers, it is sufficient to drive approximately into the vicinity of the drawbar and then push the trailer towards the transportation vehicle until the trailer drawbar, or more precisely the ball-shaped coupling of the trailer, is arranged above a so-called towball of the transportation vehicle, to couple the trailer. For heavier trailers, such a procedure is not possible. This means that the transportation vehicle must reverse in targeted state up to the trailer until the ball-shaped coupling of the trailer is situated precisely above the towball of the transportation vehicle.

It is essential here to determine an engagement position for the towball of the transportation vehicle, i.e., a corresponding target position. High requirements are here imposed on precision. The towball of the vehicle-side trailer coupling usually has a diameter of approximately 5 centimeters. This means that at the end of a maneuvering process, the trailer drawbar concerned must stand at least 2.5 centimeters away from the vehicle-side trailer coupling so that when the trailer drawbar is lowered, its ball-shaped coupling can engage directly on the towball of the trailer coupling of the transportation vehicle. Simple detection of the drawbar is not sufficient here. It is also necessary to establish directly the correct position of the trailer drawbar at which the towball of the trailer coupling of the transportation vehicle can engage.

Methods for assisting a driver of the reversing transportation vehicle when coupling to the trailer are known in themselves. Thus, for example, DE 10 2014 212 041 A1 discloses such a method. This proposes to display a camera image from a reversing camera, wherein depending on a steering angle of the transportation vehicle, an associated trajectory is shown so that a driver of the transportation vehicle can detect whether or not the respective vehicle-side and trailer-side coupling components will come to lie above each other after the reversing maneuver.

DE 10 2010 004 920 A1 describes a method for assisting with a process of coupling a trailer to a vehicle-side trailer coupling of a transportation vehicle. This proposes to determine a position of the tow coupling of the trailer relative to the vehicle-side trailer coupling of the transportation vehicle by triangulation of distances from the tow coupling of the trailer as measured by at least two distance measuring devices.

DE 10 2016 122 916 A1 also discloses a method for assisting with a process of coupling a transportation vehicle to a trailer. By using a camera, a position of a tow coupling of the trailer relative to a towball of a vehicle-side trailer coupling is determined in free space. In this context, it is proposed to emit position signals, that can be detected by the camera, by a positioning device, which is a light transmitter for emitting light signals or soundwave transmitter for emitting soundwaves.

Disclosed embodiments provide a possibility by which a coupling process of a transportation vehicle reversing up to a trailer may take place with precision.

This is achieved by a method and by a trailer-coupling assistant for assisting in a coupling process.

In the disclosed method for assisting in a coupling process of a transportation vehicle reversing towards a trailer, a ball-shaped coupling of the trailer is detected on the basis of a camera image recorded by a camera of the transportation vehicle. The camera image is then limited to an image extract containing the ball-shaped coupling. At least one curved front edge of the ball-shaped coupling is detected within the limited image extract, wherein the engagement position for a vehicle-side towball is determined on the basis of the at least one detected curved front edge of the ball-shaped coupling.

In other words, the at least one detected front edge of the trailer-side ball-shaped coupling serves as a reference geometry in determining the engagement position for the vehicle-side towball. By using the vehicle-side camera, a drawbar and the ball-shaped coupling arranged thereon are automatically detected to automatically determine the engagement position for the vehicle-side towball. In a first operation, an approximate position of the trailer and hence of the trailer's ball-shaped coupling are determined. This is based on corner detection. This is sufficient for the transportation vehicle to reverse up to the trailer and to reduce the distance between the ball-shaped coupling of the trailer and the vehicle-side towball to a few tens of centimeters, but not sufficient to position the transportation vehicle so that the towball of the vehicle-side trailer coupling can reliably engage. Therefore, in a further operation, the previously determined approximate position of the ball-shaped coupling of the trailer is used to limit the image extract containing the ball-shaped coupling. In other words, the camera image is limited to the image extract on the basis of the previously detected ball-shaped coupling of the trailer.

By using an image processing operation, optionally by several image processing operations, various edges are now detected in this image extract. These edges are filtered by various parameters to detect the at least one curved front edge of the ball-shaped coupling inside the limited image extract. For example, for this quite specific geometric properties of the curved front edge are used, such as, for example, a specific curvature of a curve path of the curved front edge, and a specific constancy of the curvature. By using the at least one detected curved front edge of the trailer's ball-shaped coupling, the precise engagement position for the vehicle-side towball is then determined. This determined engagement position for the vehicle-side towball is then used as the exact target position for the transportation vehicle. For example, it is possible to carry out an automatic maneuvering process of the transportation vehicle depending on the determined engagement position for the vehicle-side towball. In this case, it would be possible for the transportation vehicle to reverse, either partially or fully autonomously, up to the trailer to be coupled until the vehicle-side towball of the vehicle-side trailer coupling has reached the specified engagement position.

Thus, disclosed embodiments create a connection between the at least one curved, i.e., curve-shaped front edge of the ball-shaped coupling, or other edges in a frontal region of the ball-shaped coupling, and the engagement position for the vehicle-side towball, to determine the exact engagement position for the vehicle-side towball. By using the disclosed method, it is possible to determine the engagement position for the vehicle-side towball in a precise state. In particular, heavy trailers, which cannot be manually pushed up to the transportation vehicle, can be coupled by using the disclosed method. In knowledge of the defined engagement position for the vehicle-side towball, it is easily possible to predefine a target position for the transportation vehicle on approach to the trailer to be coupled.

An exemplary embodiment provides that the camera image is only limited to the image extract when a lower limit for a predefined distance between the ball-shaped coupling and the transportation vehicle has been passed because of the approach of the transportation vehicle. For example, it is possible to predefine this distance as 10, 20 or 30 centimeters. In principle, the distance is defined so as to allow a certain accuracy in detecting the at least one curved front edge of the ball-shaped coupling. When the transportation vehicle has reversed sufficiently closely to the ball-shaped coupling, the camera image is limited to the image extract. The closer the transportation vehicle reverses to the trailer, the more the image shows a top view of the ball-shaped coupling of the trailer because of the usual position of the camera, which may be a reversing camera of the transportation vehicle. Because the image extract is only limited when a lower limit for the predefined distance between the ball-shaped coupling and the transportation vehicle has been passed, it can be ensured that the camera image perspective equates at least substantially to a top view of the ball-shaped coupling of the trailer. This allows a precise determination of the engagement position for the vehicle-side towball.

A further exemplary embodiment provides that a curvature of the at least one front edge is established and the engagement position is determined depending on the established curvature. The disclosure is based on the knowledge that the curvature of the at least one front edge correlates with the engagement position for the vehicle-side towball relative to the ball-shaped coupling of the trailer. By taking into account the curvature of the at least one front edge in determining the engagement position, the latter can be established precisely.

According to a further exemplary embodiment, it is provided that by the established curvature of the at least one front edge, a center point of the front edge is determined and this is defined as the engagement position for the vehicle-side towball. The center point is determined relative to a transverse direction and a longitudinal direction of the ball-shaped coupling of the trailer, so that the engagement position for the vehicle-side towball is located at least substantially centrally below the optionally socket-like ball-shaped coupling of the trailer.

In a further exemplary embodiment, it is provided that static regions of the camera image, in particular, a rear bumper of the transportation vehicle, are masked. Such static regions of the camera image, such as, for example, the rear bumper of the transportation vehicle, are not important for determining the engagement position for the vehicle-side towball and may even be disruptive. It is therefore beneficial if such static regions of the camera image are masked, so that such regions cannot influence or disrupt the determination of the engagement position for the vehicle-side towball.

A further exemplary embodiment provides that the image extract is converted into a grayscale image before the at least one front edge is detected. This is beneficial with respect to various image processing algorithms for edge detection. Certain image processing algorithms only work—or at least work better—when the image to be evaluated is present only as grayscale. In this way, the engagement position for the vehicle-side towball can be determined precisely.

In a further exemplary embodiment, it is provided that the at least one front edge is detected by a Canny algorithm. The Canny algorithm is a robust algorithm for edge detection which is widely used in digital image processing. It breaks down into various folding operations and delivers an image which ideally contains only the edges of the original image. By using the Canny algorithm, the at least one front edge of the ball-shaped coupling can be detected reliably. Accordingly, using the Canny algorithm, the engagement position for the vehicle-side towball can be determined precisely. However, other image processing algorithms for edge detection are also possible.

A further exemplary embodiment provides that at least one further front edge of the ball-shaped coupling is detected inside the limited image extract, and the engagement position for the vehicle-side towball is determined on the basis of both detected front edges. Optionally, the respective curvatures of the front edges are determined, then using the determined curvatures an overall center point of the front edges is determined, and this overall center point is established as the engagement position for the vehicle-side towball. It may be beneficial to take account of several front edges of the ball-shaped coupling when determining the engagement position for the vehicle-side towball. When curvatures of several front edges are established, and based thereon the overall center point of the front edges is determined, and this overall center point is defined as the engagement position for the vehicle-side towball, the engagement position for the vehicle-side towball may be determined precisely. For example, in this way, because of the position of the vehicle-side camera, any existing perspective distortions in detecting the ball-shaped coupling and finally the front edges of the ball-shaped couplings may also be compensated, so that the engagement position for the vehicle-side towball may be determined with precision.

The disclosed trailer-coupling assistant for a transportation vehicle is configured to perform the disclosed method and an exemplary embodiment of the disclosed method. Illustrative embodiments of the disclosed method may be regarded as exemplary embodiments of the disclosed trailer-coupling assistant and vice versa, wherein the trailer-coupling assistant comprises methods or mechanisms for performance of the method operations. Furthermore, the trailer-coupling assistant may comprise an image processing device which is configured to perform the method operations. The trailer-coupling assistant may comprise a data interface for receiving image data from the vehicle-side camera. Also, the trailer-coupling assistant may, for example, be configured as an aftermarket solution, which—assuming corresponding vehicle-side interfaces—can easily be fitted into any transportation vehicles. Naturally, it is also possible that the trailer-coupling assistant is provided in advance on production of the transportation vehicle.

The disclosed transportation vehicle comprises the disclosed trailer-coupling assistant or an exemplary embodiment of the trailer-coupling assistant.

In the figures, the same elements or those of equivalent function carry the same reference signs.

A process of coupling a reversing transportation vehicle 1 to a trailer 2 is shown in top view in FIG. 1. The transportation vehicle 1 here follows a trajectory 3 (indicated diagrammatically) to approach a drawbar 4 of the trailer 2, the front side of which carries a ball-shaped coupling 5. In the present exemplary embodiment shown, it should be assumed that the trailer 2 is so heavy that it cannot be maneuvered easily manually, i.e., by hand. It is therefore necessary for the transportation vehicle 1 to reverse precisely up to the ball-shaped coupling 5 of the trailer 2, so that the drawbar 4 need then merely be lowered to couple the trailer 2 to the transportation vehicle 1.

Figure 2:
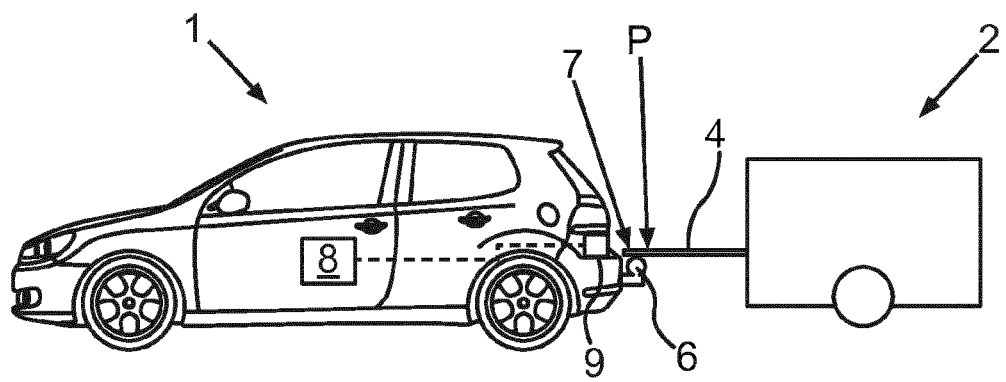
FIG. 2 shows a side view of the transportation vehicle after the transportation vehicle has been coupled to the trailer.

FIG. 2 shows a side view of the transportation vehicle 1 after coupling to the trailer 2. A vehicle-side towball 6 is here positioned in an engagement position P below the drawbar 4, so that the drawbar 4 with its ball-shaped coupling 5 (not shown here) need merely be lowered for the vehicle-side towball 6 to be able to engage or lock into the ball-shaped coupling 5 of the trailer 2. A front edge 7 of the ball-shaped coupling 5 (not shown here in detail) of the trailer 2 is also indicated purely diagrammatically.

To be able to determine the engagement position P for the vehicle-side towball 6 with precision, the transportation vehicle 1 comprises a trailer-coupling assistant 8 which is configured to determine the engagement position P for the vehicle-side towball 6. Furthermore, a reversing camera 9 of the transportation vehicle 1 is indicated schematically. The trailer-coupling assistant 8 and the reversing camera 9 are connected together for signal transmission, so that the trailer-coupling assistant 8 can receive and evaluate image signals from the reversing camera 9. A method for assisting in a process of coupling the trailer 2 to the transportation vehicle 1 will be described in more detail below with reference to the figures which follow.

Figure 3:
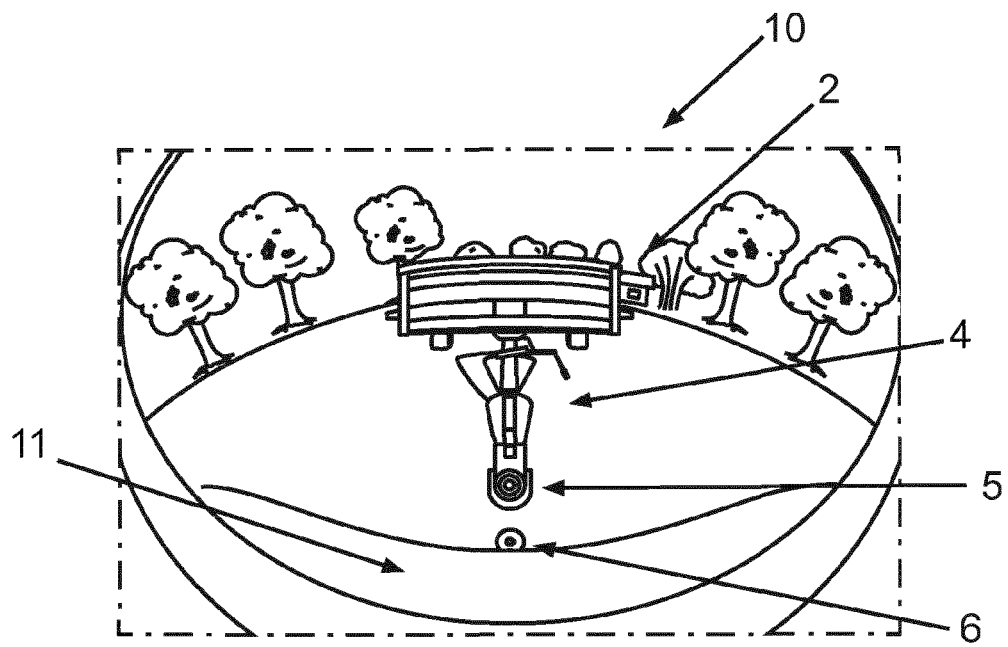
FIG. 3 shows a camera image recorded by a reversing camera of the transportation vehicle while the transportation vehicle is reversing up to the trailer.

FIG. 3 shows a camera image 10 recorded by the reversing camera 9. The camera image 10 shows the trailer 2, with its drawbar 4 and ball-shaped coupling 5 arranged thereon, situated at the rear of the transportation vehicle 1. Furthermore, the vehicle-side towball 6 can be seen inside the camera image 10, together with a rear bumper 11 of the transportation vehicle 1. By using the trailer-coupling assistant 8, the camera image 10 recorded by the reversing camera 9 is used to detect the ball-shaped coupling 5 of the trailer 2, and also to determine the position of the ball-shaped coupling 5. Static regions of the camera image 10, in particular, the rear bumper 11, are then masked. The rear bumper 11 or other components of the transportation vehicle 1 are of no further interest in determining the engagement position P for the vehicle-side towball 6, and may even be disruptive. Therefore such static regions are masked or otherwise faded out.

Figure 4:
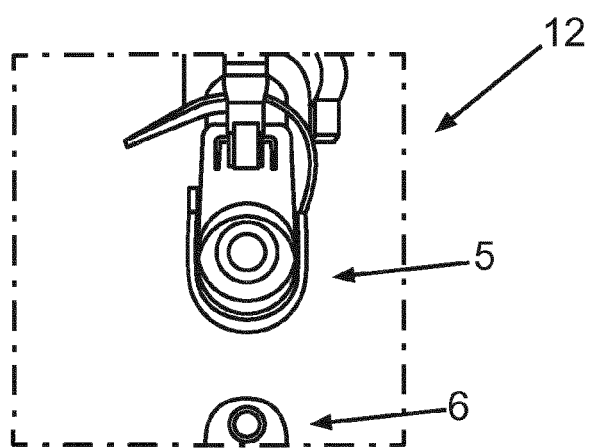
FIG. 4 shows a limited image extract of the camera image recorded by the reversing camera, showing a ball-shaped coupling of the trailer and the vehicle-side towball.

FIG. 4 shows an image extract 12 of the camera image 10. As soon as the transportation vehicle 1 has drawn closer than a predefined distance from the detected ball-shaped coupling 5, the camera image 10 is limited to the image extract 12 shown in FIG. 4. This may take place, for example, when a distance between the vehicle-side towball 6 and the ball-shaped coupling 5 has fallen to below 10, 20 or 30 centimeters. The distance from which the camera image 10 is limited to the image extract 12 may be established, for example, depending on the position of the reversing camera 9 of the transportation vehicle 1. One important factor amongst others for precise determination of the correct engagement position P of the vehicle-side towball 6 is how clearly or evidently the ball-shaped coupling 5 can be identified in a top view in the image extract 12 of the camera image 10. The closer the transportation vehicle 1 reverses to the trailer 2, the more the perspective of the camera image 10 changes to a top view onto the ball-shaped coupling 5.

Figure 5:
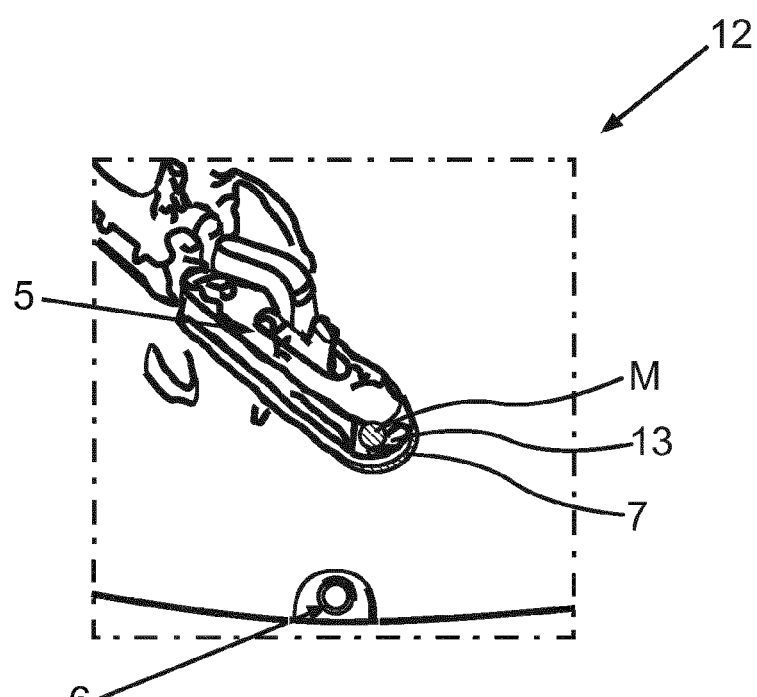
FIG. 5 shows a further depiction of the limited image extract, wherein two detected front edges of the trailer's ball-shaped coupling, which serve to determine an engagement position of the vehicle-side towball, are visually emphasized.

FIG. 5 shows a further illustration of the image extract 12 of the camera image 10, wherein as well as the front edge 7 indicated schematically in connection with FIG. 2, a further front edge 13 of the ball-shaped coupling is visually marked or emphasized. The trailer-coupling assistant 8 detects these curved front edges 7, 13 of the ball-shaped coupling 5 of the trailer 2 inside the limited image extract 12. To be able to detect these front edges 7, 13 reliably, the image extract 12 is first converted into a grayscale image. The edges, in particular, the front edges 7, 13, are detected within the image extract 12, optionally by use of the so-called Canny algorithm. This requires the image extract 12 to be present as a grayscale image. The Canny algorithm is a robust algorithm for edge detection which is widely used in digital image processing. Using this algorithm, an image can be supplied which ideally now contains only the edges of the original image, i.e., the image extract 12. Other image processing algorithms for edge detection are however also possible.

Optionally, several image processing operations are used to detect various edges within the image extract 12. All of these edges are filtered by various parameters to detect the two front edges 7, 13, here emphasized visually. For example, information with regard to certain geometric features of the front edges 7, 13, such as, e.g., certain curvatures and their constancy, may be used to distinguish the front edges 7, 13 from other edges in the image extract 12.

Respective curvatures of the front edges 7, 13 are determined within the image extract 12. Using the determined curvatures, an overall center point M of the front edges 7, 13 is determined. This overall center point M is then established as the engagement position P for the vehicle-side towball 6.

For this, for example, respective center points (not designated in more detail here) of the curved front edges 7, 13 are determined. Also, for example, an orientation of the trailer 2 relative to the transportation vehicle 1, in particular, relative to the reversing camera 9, may be taken into account to determine the overall center point M and finally the engagement position P. In very rare cases, the reversing camera 9 shows a pure top view of the ball-shaped coupling 5 of the trailer 2. Taking into account the camera perspective of the reversing camera 9, using the detected front edges 7, 13, the overall center point M may be determined which then at least substantially corresponds to the overall center point of the spherically curved underside of the ball-shaped coupling 5 of the trailer 2.

In knowledge of the engagement position P thus determined, a target position for the transportation vehicle 1 may be predefined. For example, it is conceivable that the trailer-coupling assistant 8 is configured to reverse the transportation vehicle 1 up to the trailer 2 partly or fully autonomously, until the vehicle-side towball 6 is positioned in the specified engagement position P below the ball-shaped coupling 5 of the trailer 2. Then the drawbar 4 need merely be moved downward until the towball 6 of the transportation vehicle 1 has engaged in the ball-shaped coupling 5 of the trailer 2.

Using the method described and the trailer-coupling assistant 8 described, a process of coupling the transportation vehicle 1 to the trailer 2 when the transportation vehicle 1 is reversing up to the trailer 2 may be supported precisely. The disclosure is not restricted purely to the use of the overall center point M of the front edges 7, 13, but generally includes the use of one or more front edges 7, 13 in a frontal region of the ball-shaped coupling 5 of the trailer 2 as a reference for determining the precise engagement position P of the towball 6 of the transportation vehicle 1.

LIST OF REFERENCE SIGNS

1 Transportation vehicle
2 Trailer
3 Trajectory
4 Trailer drawbar
5 Ball-shaped coupling of trailer
6 Towball of transportation vehicle
7 Front edge of ball-shaped coupling
8 Trailer-coupling assistant
9 Reversing camera
10 Camera image from reversing camera
11 Rear bumper of transportation vehicle
12 Image extract of camera image from reversing camera
13 Front edge of ball-shaped coupling
M Overall center point
P Engagement position for towball of transportation vehicle

The invention claimed is:

1. A method for assisting in a coupling process of a transportation vehicle reversing toward a trailer, the method comprising:
 recording a camera image via a camera of the transportation vehicle;
 detecting a ball-shaped coupling of the trailer based on the recorded camera image, the ball-shaped coupling including at least one curved front edge having a curvature with at least one curved path;
 extracting, in response to recording the camera image, an image extract of the camera image containing the ball-shaped coupling, wherein the image extract is a magnified portion of the camera image containing the ball-shaped coupling;
 detecting the curvature of the at least one curved path of the at least one curved front edge of the ball-shaped coupling within the limited image extract; and
 determining the engagement position for a vehicle-side towball based on the at least one detected curved front edge of the ball-shaped coupling.

2. The method of claim 1, wherein the image extract is only extracted in response to a lower limit for a predefined distance between the ball-shaped coupling and the transportation vehicle being passed because of the approach of the transportation vehicle.

3. The method of claim 1, wherein the engagement position is determined based on the curvature of the at least one detected curved front edge.

4. The method of claim 3, wherein a center point of the curvature of the at least one detected curved front edge is determined by the curvature of the at least one curved front edge and is defined as the engagement position for the vehicle-side towball.

5. The method of claim 1, wherein static regions of the camera image are masked.

6. The method of claim 1, wherein the image extract is converted into a grayscale image before the at least one curved front edge is detected.

7. The method of claim 6, wherein the at least one curved front edge is detected by a Canny algorithm.

8. The method of claim 1, wherein at least one further front edge of the ball-shaped coupling is detected inside the image extract, and the engagement position for the vehicle-side towball is determined based on the at least one further front edge and the at least one curved front edge.

9. The method of claim 8, further comprising:
 establishing an overall center point based on the curvature of the at least one curved front edge and a center point of the at least one further front edge,
 wherein the overall center point is defined as the engagement position for the vehicle-side towball.

10. A trailer-coupling assistant for a transportation vehicle, wherein the trailer-coupling assistant provides functionality to assist in a coupling process of a transportation vehicle reversing toward a trailer, including:
 recording a camera image via a camera of the transportation vehicle;
 detecting a ball-shaped coupling of the trailer based on the recorded camera image, the ball-shaped coupling including at least one curved front edge having a curvature with at least one curved path;
 extracting, in response to recording the camera image, an image extract of the camera image containing the ball-shaped coupling, wherein the image extract is a magnified portion of the camera image containing the ball-shaped coupling;
 detecting the curvature of the at least one curved path of the at least one curved front edge of the ball-shaped coupling within the limited image extract; and
 determining the engagement position for a vehicle-side towball based on the at least one detected curved front edge of the ball-shaped coupling.

11. A transportation vehicle comprising the trailer-coupling assistant of claim 10.

12. The assistant of claim 10, wherein the image extract is only extracted in response to a lower limit for a predefined distance between the ball-shaped coupling and the transportation vehicle being passed because of the approach of the transportation vehicle.

13. The assistant of claim 10, wherein the engagement position is determined based on the curvature of the at least one detected curved front edge.

14. The assistant of claim 13, wherein a center point of the curvature of the at least one detected curved front edge is determined by the curvature of the at least one curved front edge and is defined as the engagement position for the vehicle-side towball.

15. The assistant of claim 10, wherein static regions of the camera image are masked.

16. The assistant of claim 10, wherein the image extract is converted into a grayscale image before the at least one curved front edge is detected.

17. The assistant of claim 16, wherein the at least one curved front edge is detected by a Canny algorithm.

18. The assistant of claim 10, wherein at least one further front edge of the ball-shaped coupling is detected inside the limited image extract, and the engagement position for the vehicle-side towball is determined based on the at least one further front edge and the at least one curved front edge.

19. The assistant of claim 18, further comprising:
   establishing an overall center point based on the curvature of the at least one curved front edge and a center point of the at least one further front edge,
   wherein the overall center point is defined as the engagement position for the vehicle-side towball.

20. The method of claim 1, wherein the detecting further includes detecting a curve constancy of the curvature of the at least one curved path of the at least one curved front edge of the ball-shaped coupling within the limited image extract, and wherein the determining further includes determining the engagement position for a vehicle-side towball based on the curve constancy of the curvature of the at least one curved path of the at least one curved front edge of the ball-shaped coupling.

\* \* \* \* \*